US012114241B2

(12) United States Patent
Takabatake et al.

(10) Patent No.: US 12,114,241 B2
(45) Date of Patent: Oct. 8, 2024

(54) DISPLAY CONTROL DEVICE, DISPLAY CONTROL METHOD, AND DISPLAY CONTROL PROGRAM

(71) Applicant: TOYOTA JIDOSHA KABUSHIKI KAISHA, Toyota (JP)

(72) Inventors: Satoaki Takabatake, Nissin (JP); Koji Kimura, Nagoya (JP); Junji Miyazaki, Nagoya (JP); Yuki Yoshida, Toyota (JP); Ryo Ogata, Toyota (JP); Tadashi Morishita, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 185 days.

(21) Appl. No.: 17/406,420

(22) Filed: Aug. 19, 2021

(65) Prior Publication Data
US 2022/0070638 A1 Mar. 3, 2022

(30) Foreign Application Priority Data

Aug. 31, 2020 (JP) ................................ 2020-146391

(51) Int. Cl.
*B60K 35/00* (2024.01)
*B60K 35/23* (2024.01)
(Continued)

(52) U.S. Cl.
CPC .............. *H04W 4/46* (2018.02); *B60W 10/20* (2013.01); *B60W 30/18163* (2013.01);
(Continued)

(58) Field of Classification Search
CPC ........... B60W 10/20; B60W 30/18163; B60W 50/14; B60W 2050/146; B60W 2556/65;
(Continued)

(56) References Cited

U.S. PATENT DOCUMENTS

2016/0332624 A1* 11/2016 Tezuka ................. B60W 30/16
2017/0240109 A1* 8/2017 Kimura .................... G08G 1/16
(Continued)

FOREIGN PATENT DOCUMENTS

| JP | 2013-088894 A | 5/2013 |
| JP | 2018-203011 A | 12/2018 |
| JP | 2020-042612 A | 3/2020 |

*Primary Examiner* — Abby Y Lin
*Assistant Examiner* — Hossam M Abd El Latif
(74) *Attorney, Agent, or Firm* — Oliff PLC

(57) ABSTRACT

A display control ECU includes an information acquisition section and a display control section. The information acquisition section acquires information relating to a peripheral target object that is present ahead of the vehicle and in a subject vehicle lane in which the vehicle is currently traveling, and information relating to an object requiring caution that is present outside of the subject vehicle lane and having implications for control during the autonomous driving. The display control section displays an image of the peripheral target object, regarding which information has been acquired by the information acquisition section on a heads-up display provided inside a cabin of the vehicle, and additionally displays on the heads-up display an image of the object requiring caution in a case in which information relating to the object requiring caution has been acquired by the information acquisition section.

12 Claims, 13 Drawing Sheets

(51) Int. Cl.

| | |
|---|---|
| *B60K 35/28* | (2024.01) |
| *B60K 35/29* | (2024.01) |
| *B60W 10/20* | (2006.01) |
| *B60W 30/18* | (2012.01) |
| *B60W 50/14* | (2020.01) |
| *B60W 60/00* | (2020.01) |
| *G05D 1/00* | (2024.01) |
| *H04L 67/12* | (2022.01) |
| *H04W 4/46* | (2018.01) |
| *H04W 4/48* | (2018.01) |

(52) U.S. Cl.
CPC ........... *B60W 50/14* (2013.01); *G05D 1/0257* (2013.01); *B60R 2300/304* (2013.01); *B60W 2050/146* (2013.01); *B60W 2556/65* (2020.02)

(58) Field of Classification Search
CPC ............. B60W 60/00; B60K 2370/191; B60K 2370/194; B60K 35/00; B60K 2370/1529; B60K 2370/177; B60R 2300/304; G05D 1/0257; H04L 67/12; H04W 4/46; H04W 4/48
USPC .......................................................... 701/23
See application file for complete search history.

(56) References Cited

U.S. PATENT DOCUMENTS

| | | | |
|---|---|---|---|
| 2018/0345991 A1* | 12/2018 | Mimura | ................ B60W 50/14 |
| 2019/0111943 A1* | 4/2019 | Suzuki | .............. B60W 60/0055 |
| 2020/0079379 A1* | 3/2020 | Mimura | ................ B60W 10/20 |
| 2023/0339494 A1* | 10/2023 | Hack | .......................... B62J 6/26 |

* cited by examiner

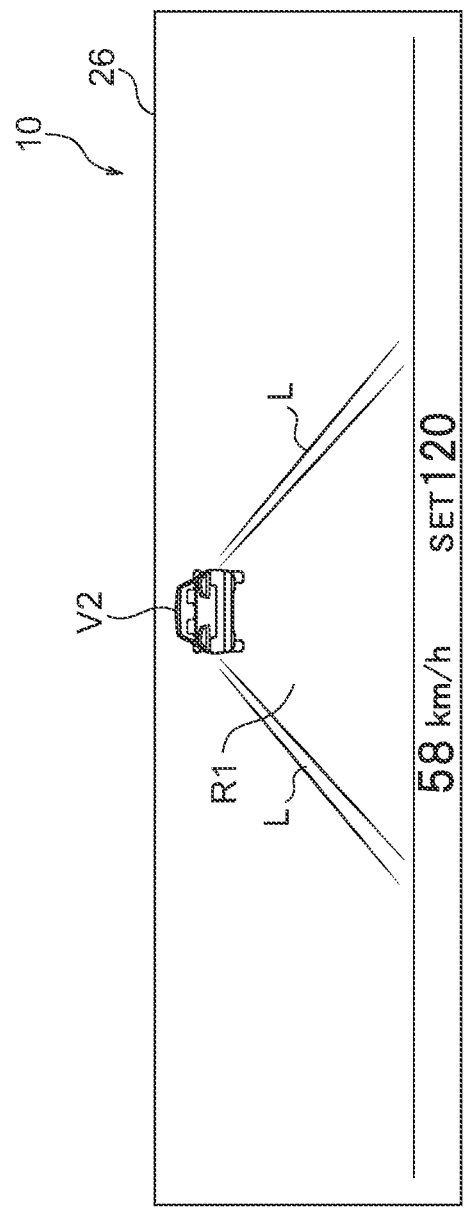

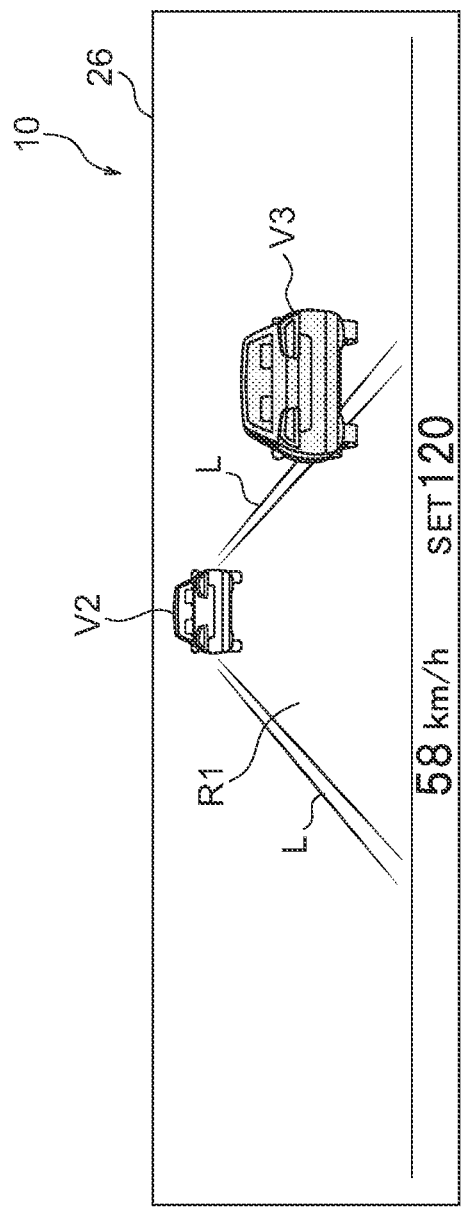

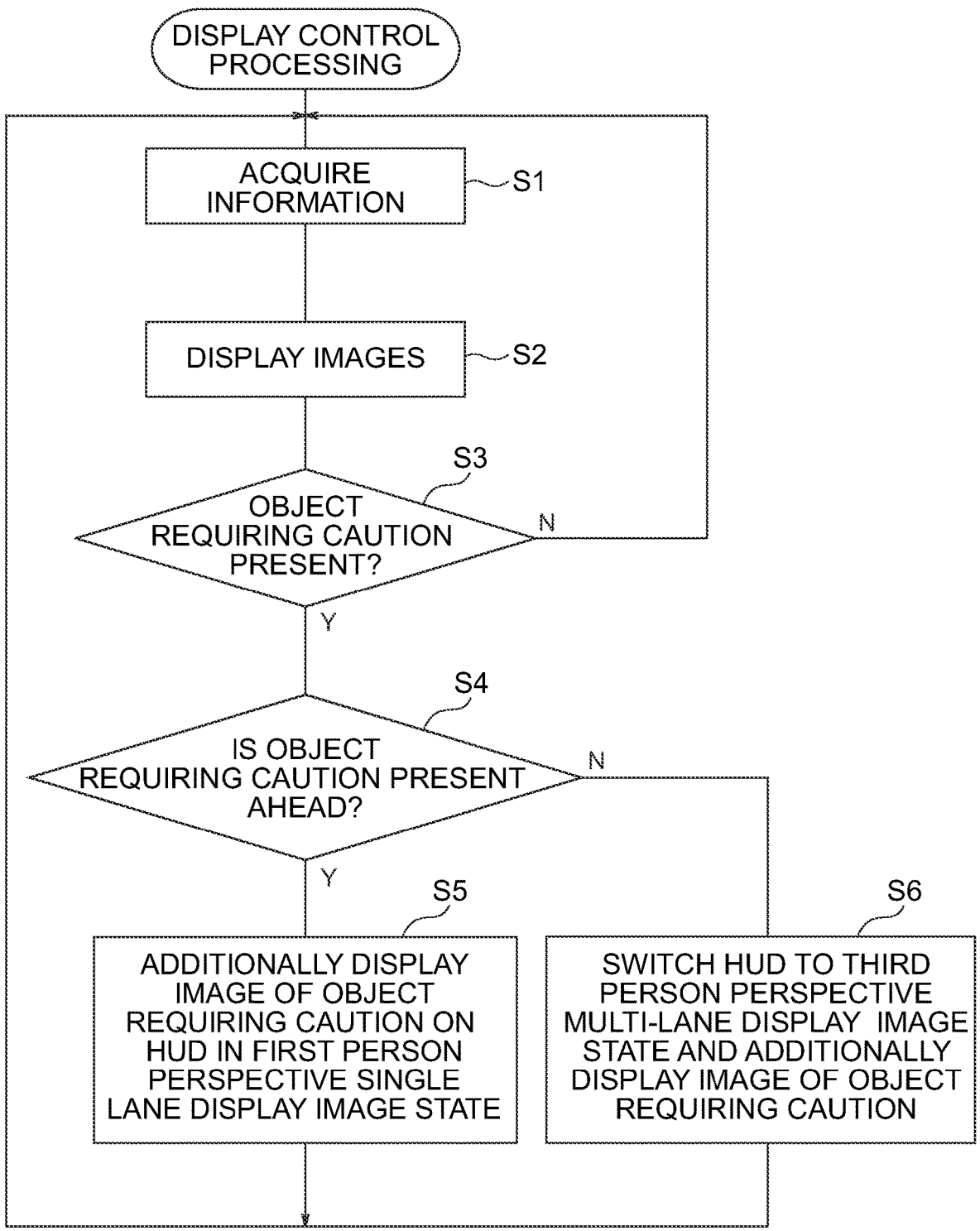

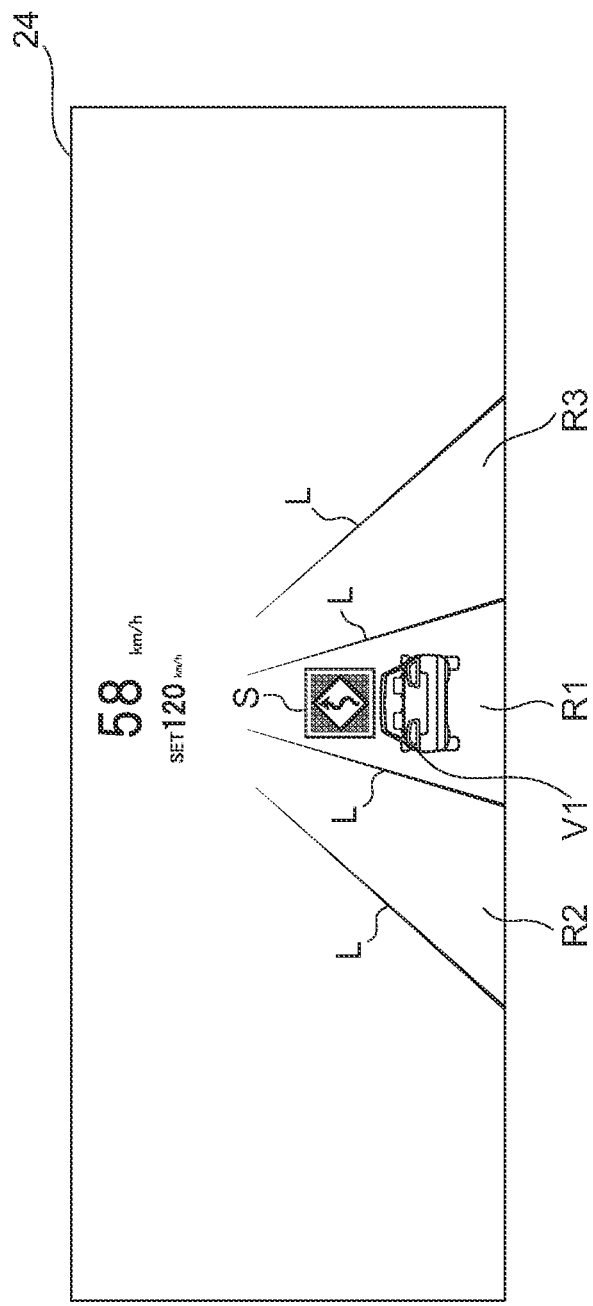

DISPLAY CONTROL DEVICE, DISPLAY CONTROL METHOD, AND DISPLAY CONTROL PROGRAM

CROSS-REFERENCE TO RELATED APPLICATION

This application is based on and claims priority under 35 USC 119 from Japanese Patent Application No. 2020-146391 filed on Aug. 31, 2020, the disclosure of which is incorporated by reference herein.

BACKGROUND

Technical Field

The present disclosure relates to a display control device installed in a vehicle configured to enable autonomous driving, a display control method, and a display control program.

Related Art

Japanese Patent Application Laid-Open (JP-A) No. 2020-042612 discloses a vehicle control device including a display section, a recognition section, a driving control section, and a display control section. The display section displays an image. The recognition section recognizes objects such as other vehicles present in the periphery of an subject vehicle. The driving control section generates a target trajectory of the subject vehicle based on a state of an object recognized by the recognition section, and controls one or both out of speed or steering of the subject vehicle based on the generated target trajectory. The display control section displays on the display section an image simulating another vehicle recognized as an object by the recognition section overlaid on an image simulating the road on which the subject vehicle is present. Of the other vehicles recognized as objects present in the periphery of the subject vehicle, the display control section displays a first image simulating a first vehicle that may influence behavior of the subject vehicle by the driving control section and display of a second image simulating a second vehicle that may influence generation of the target trajectory with greater emphasis than display of a third image simulating a third vehicle that is a different vehicle from the first vehicle and the second vehicle. This suppresses anxiety felt by an occupant during autonomous driving.

SUMMARY

In the above-described Related Art, in a case in which the subject vehicle is traveling along a road with multiple traffic lanes, the display section is configured to display an image simulating the road with multiple traffic lanes, images simulating plural other vehicles traveling in the respective traffic lanes, and an image simulating the subject vehicle. However, displaying images of multiple traffic lanes and multiple vehicles on the display section in this manner may be annoying to an occupant of the subject vehicle due to an excessive amount of information.

In consideration of the above circumstances, an object of the present disclosure is to obtain a display control device, a display control method, and a display control program capable of suppressing anxiety and annoyance felt by an occupant during autonomous driving.

A display control device of a first aspect of the present disclosure is installed in a vehicle configured to enable autonomous driving. The display control device includes an information acquisition section and a display control section. The information acquisition section is configured to acquire information relating to a peripheral target object that is present ahead of the vehicle and in a subject vehicle lane in which the vehicle is currently traveling, and information relating to an object requiring caution that is present outside of the subject vehicle lane and has implications for control during the autonomous driving. The display control section is configured to display an image of the peripheral target object, regarding which information has been acquired by the information acquisition section, on a display section, provided inside a cabin of the vehicle, and to additionally display, on the display section, an image of the object requiring caution in a case in which information relating to the object requiring caution has been acquired by the information acquisition section.

In the first aspect, the display control device installed in the vehicle configured to enable autonomous driving includes the information acquisition section and the display control section. The information acquisition section acquires information relating to the peripheral target object that is present in the subject vehicle lane in which the vehicle is currently traveling, and information relating to the object requiring caution that is present outside of the subject vehicle lane and has implications for control during autonomous driving. The display control section displays the image of the peripheral target object, regarding which information has been acquired by the information acquisition section, on the display section, provided inside the cabin of the vehicle. The display control section additionally displays on the display section the image of the object requiring caution in a case in which information relating to the object requiring caution has been acquired by the information acquisition section. Additionally displaying the object requiring caution on the display section in this manner helps an occupant to anticipate that there will be implications for control during autonomous driving. This enables any anxiety felt by the occupant during autonomous driving to be suppressed. Moreover, normally when the object requiring caution is not present, peripheral target objects present outside the subject vehicle lane are not displayed on the display section, thereby enabling annoyance felt by the occupant to be suppressed.

A display control device of a second aspect is the first aspect, wherein the display section is a heads-up display configured to display the respective images overlaid on a scene ahead as viewed through a windshield of the vehicle by an occupant in a driver's seat of the vehicle.

In the second aspect, the heads-up display configuring the display section is configured to display the image of the peripheral target object and the image of the object requiring caution overlaid on the scene ahead as viewed through the windshield by the occupant in the driver's seat. In configurations in which multiple images of peripheral target objects and the like are displayed overlaid on the scene ahead in such a heads-up display, the occupant is likely to feel annoyance. However, the above-described configuration of the present aspect enables such annoyance to be avoided.

A display control device of a third aspect is either the first aspect or the second aspect, wherein the display control section displays the image of the object requiring caution on the display section with greater emphasis than the image of the peripheral target object.

In the third aspect, in a case in which an object requiring caution having implications for control during autonomous driving is present outside of the subject vehicle lane, the image of the object requiring caution is displayed with greater emphasis on the display section than the image of the peripheral target object. This helps the occupant to recognize the object requiring caution, thereby further helping the occupant to anticipate that there will be implications for control during autonomous driving.

A display control device of a fourth aspect is the third aspect, wherein the display control section displays the image of the object requiring caution in a different color from the image of the peripheral target object.

In the fourth aspect, in a case in which the object requiring caution having implications for control during autonomous driving is present outside of the subject vehicle lane, the image of the object requiring caution is displayed on the display section in a different color from the image of the peripheral target object. This color difference enables the image of the object requiring caution to be emphasized.

A display control device of a fifth aspect is any one of the first aspect to the fourth aspect, wherein in a case in which the information acquisition section has acquired information relating to the object requiring caution that is present ahead of the vehicle, the display control section displays the object requiring caution on the display section as an image simulating a state viewed through a windshield of the vehicle by an occupant in a driver's seat of the vehicle.

In the fifth aspect, in a case in which the object requiring caution having implications for control during autonomous driving is present ahead of the vehicle, the object requiring caution is displayed on the display section as the image simulating a state viewed through the windshield by the occupant in the driver's seat of the vehicle. This helps the occupant in the driver's seat to recognize the actuation situation.

A display control device of a sixth aspect is any one of the first aspect to the fifth aspect, wherein in a case in which the information acquisition section has acquired information relating to the object requiring caution, which is present to the rear or to a side of the vehicle, the display control section displays the object requiring caution and the vehicle on the display section as an image simulating a state viewed from obliquely above and to the rear of the vehicle.

In the sixth aspect, in a case in which the object requiring caution that has implications for control during autonomous driving is present to the rear or to a side of the vehicle, the object requiring caution and the vehicle are displayed on the display section as the image simulating a state viewed from obliquely above and to the rear of the vehicle. This helps the occupant to anticipate that there will be implications for autonomous driving control due to the object requiring caution being present to the rear or to the side of the vehicle.

A display control device of a seventh aspect is any one of the first aspect to the sixth aspect, wherein the display section is a heads-up display configured to display the respective images overlaid on a scene ahead as viewed through a windshield of the vehicle by an occupant in a driver's seat of the vehicle. A meter display having a larger display region than the heads-up display is provided to an instrument panel of the vehicle. The display control section is configured to display the vehicle and the periphery of the vehicle on the meter display as an image simulating a state viewed from obliquely above and to the rear of the vehicle.

In the seventh aspect, similarly to in the second aspect, the heads-up display configuring the display section is configured to display the image of the peripheral target object and the image of the object requiring caution overlaid on the scene ahead as viewed through the windshield by the occupant in the driver's seat. In addition thereto, the vehicle and the periphery thereof can be displayed on the meter display provided at the instrument panel of the vehicle as the image simulating a state viewed from obliquely above and to the rear of the vehicle. Since the meter display has a larger display region than the heads-up display, information and so on that may become annoying were it to be displayed on the heads-up display can easily be displayed on the meter display. This enables any annoyance felt toward display on the heads-up display to be suppressed, while also conveying a variety of information to the occupant in the driver's seat using the meter display.

A display control method of an eighth aspect is a display control method for implementation by a processor installed in a vehicle configured to enable autonomous driving. The display control method includes: attempting to acquire information relating to a peripheral target object that is present ahead of the vehicle and in an subject vehicle lane in which the vehicle is currently traveling, and information relating to an object requiring caution that is present outside of the subject vehicle lane and has implications for control during the autonomous driving; displaying an image of the peripheral target object, regarding which information has been acquired, on a display section provided inside a cabin of the vehicle; and additionally displaying, on the display section, an image of the object requiring caution in a case in which information relating to the object requiring caution has been acquired.

In the eighth aspect, the display control method for implementation by a processor installed in a vehicle configured to enable autonomous driving includes the acquisition step, the display step, and the additional display step. In the acquisition step, the processor attempts to acquire information relating to a peripheral target object that is present in the subject vehicle lane in which the vehicle is currently traveling, and information relating to an object requiring caution that is present outside of the subject vehicle lane and having implications for control during the autonomous driving. In the display step, the processor displays the image of the peripheral target object, regarding which information has been acquired, on the display section provided inside the cabin of the vehicle. In the additional display step, the processor additionally displays on the display section the image of the object requiring caution in a case in which information relating to the object requiring caution has been acquired. Additionally displaying the object requiring caution on the display section in this manner helps the occupant to anticipate that there will be implications for control during autonomous driving. This enables any anxiety felt by the occupant during autonomous driving to be suppressed. Moreover, normally when the object requiring caution is not present, peripheral target objects present outside the subject vehicle lane are not displayed on the display section, thereby enabling annoyance felt by the occupant to be suppressed.

A display control program of a ninth aspect is a display control program for executable by a processor installed in a vehicle configured to enable autonomous driving. The display control program includes: attempting to acquire information relating to a peripheral target object that is present ahead of the vehicle and in an subject vehicle lane in which the vehicle is currently traveling, and information relating to an object requiring caution that is present outside of the subject vehicle lane and has implications for control during the autonomous driving; displaying an image of the peripheral target object, regarding which information has been acquired, on a display section provided inside a cabin of the vehicle; and additionally displaying on the display section an image of the object requiring caution in a case in which information relating to the object requiring caution has been acquired.

In the ninth aspect, the display control program for execution by a processor installed in a vehicle configured to enable autonomous driving includes the acquisition step, the display step, and the additional display step. In the acquisition step, the processor attempts to acquire information relating to a peripheral target object present in the subject vehicle lane in which the vehicle is currently traveling, and information relating to an object requiring caution present outside of the subject vehicle lane and having implications for control during the autonomous driving. In the display step, the processor displays the image of the peripheral target object for which information has been acquired on the display section provided inside the cabin of the vehicle. In the additional display step, the processor additionally displays on the display section the image of the object requiring caution in a case in which information relating to the object requiring caution has been acquired. Additionally displaying the object requiring caution on the display section in this manner helps the occupant to anticipate that there will be implications for control during autonomous driving. This enables any anxiety felt by the occupant during autonomous driving to be suppressed. Moreover, normally when the object requiring caution is not present, peripheral target objects present outside the subject vehicle lane are not displayed on the display section, thereby enabling annoyance felt by the occupant to be suppressed.

As described above, the display control device, the display control method, and the display control program according to the present disclosure enable anxiety and annoyance felt by an occupant during autonomous driving to be suppressed.

BRIEF DESCRIPTION OF THE DRAWINGS

Exemplary embodiments of the present disclosure will be described in detail based on the following figures, wherein:

FIG. 4A is a diagram illustrating a first example of display on a heads-up display;

FIG. 5A is a diagram illustrating a second example of display on a heads-up display;

FIG. 7 is a flowchart illustrating an example of a flow of display control processing in an exemplary embodiment;

FIG. 8B is a diagram illustrating an example of display on a meter display of a reference example.

DETAILED DESCRIPTION

Explanation follows regarding a display control ECU 70, serving as a display control device according to an exemplary embodiment of the present disclosure, with reference to FIG. 1 to FIG. 7. The display control ECU 70 is installed in a vehicle 12, illustrated in FIG. 1. The vehicle 12 is, for example, capable of switching between autonomous driving and manual driving. The vehicle 12 will be referred to hereafter as the "subject vehicle 12".

Figure 1:
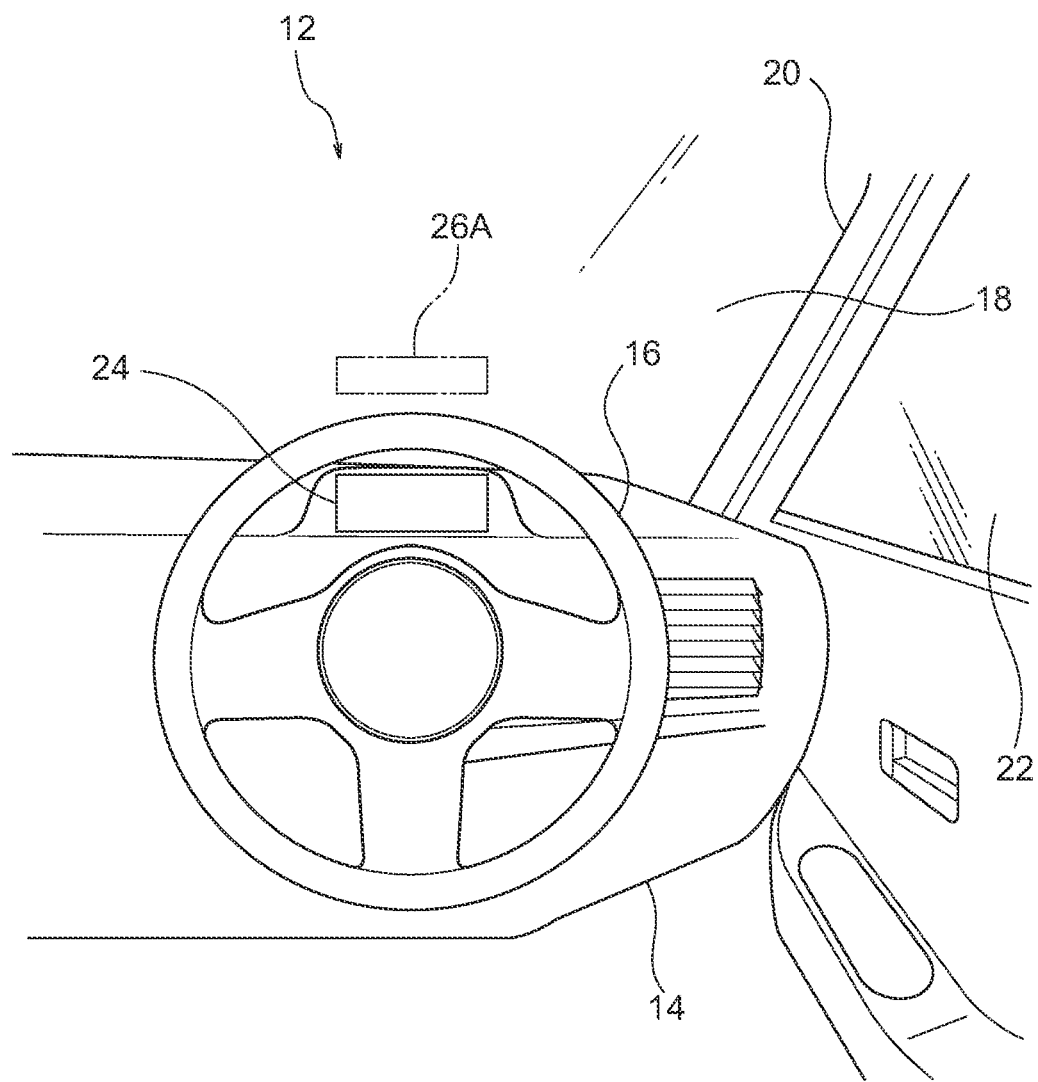
FIG. 1 is a perspective view illustrating a front section of a cabin of a vehicle installed with a display control ECU serving as a display control device according to an exemplary embodiment, as viewed from a vehicle rear side.

As illustrated in FIG. 1, an instrument panel 14 is provided to a front section inside a cabin of the subject vehicle 12. The instrument panel 14 extends in a vehicle width direction, and a steering wheel 16 is provided on a vehicle right side of the instrument panel 14. The present exemplary embodiment uses the example of a right hand drive vehicle in which the steering wheel 16 is provided on the right side as an example, and a driver's seat, not illustrated in the drawings, is installed on the right side inside the cabin.

The instrument panel 14 is installed at a vehicle lower side of a windshield glass 18. The windshield glass 18 is inclined downward on progression toward a vehicle front side, and partitions between the interior of the cabin and the exterior of the cabin. The windshield glass 18 corresponds to a windshield of the present disclosure.

A vehicle right side edge of the windshield glass 18 is fixed to a vehicle right side front pillar 20. The front pillar 20 extends in a vehicle vertical direction, and the windshield glass 18 is fixed to a vehicle width direction inside end portion of the front pillar 20. A front side window glass 22 is disposed at the vehicle rear side of the front pillar 20. Note that a vehicle left side edge of the windshield glass 18 is fixed to a vehicle left side front pillar, not illustrated in the drawings.

An upper portion of the instrument panel 14 at the vehicle front of the driver's seat is provided with a meter display 24. The meter display 24 is provided at a position that falls within the field of vision of the driver in a state in which the driver is looking toward the vehicle front.

Figure 2:
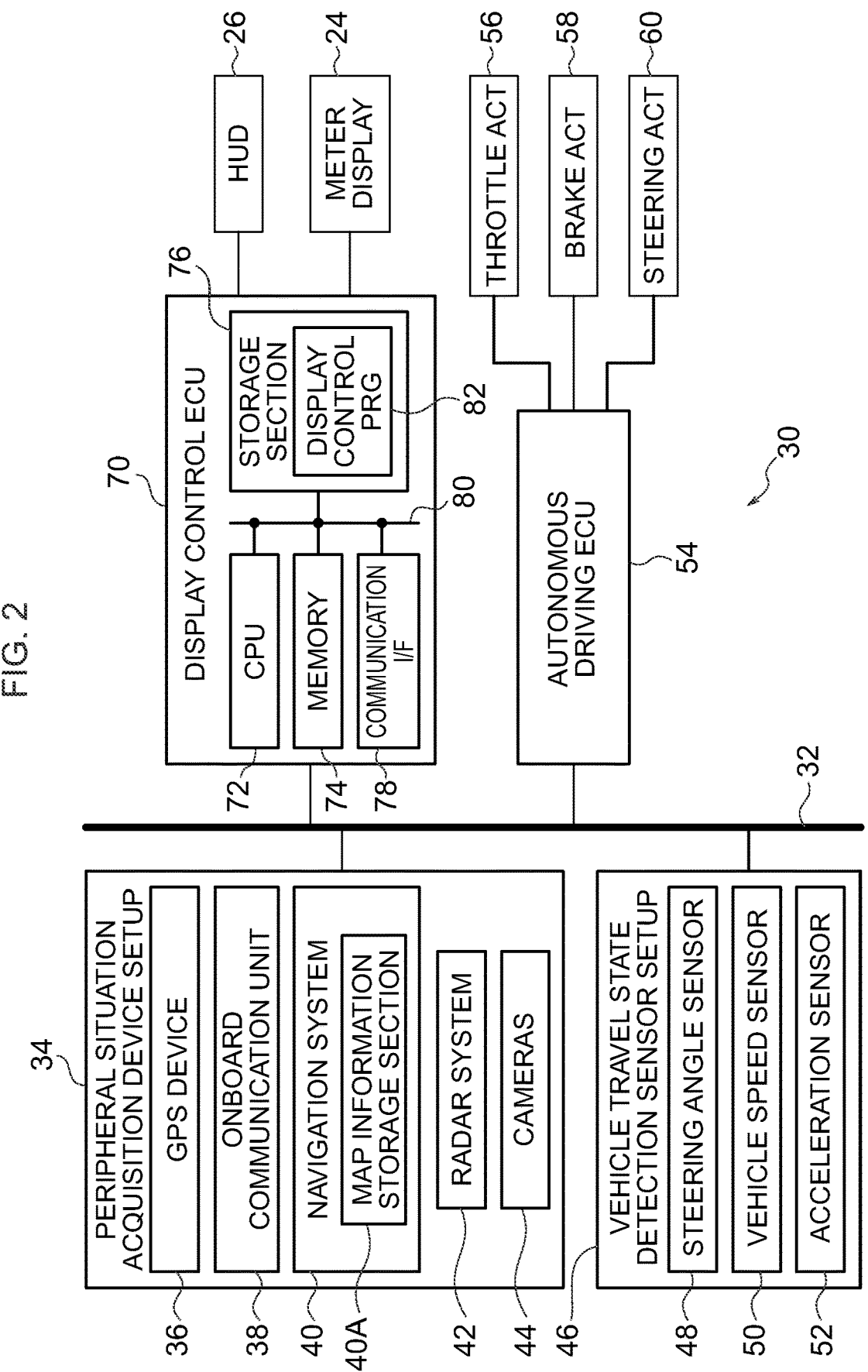
FIG. 2 is a block diagram illustrating a partial hardware configuration of an onboard system configured including a display control ECU according to an exemplary embodiment.

The upper portion of the instrument panel 14 at the vehicle front of the driver's seat is also provided with a heads-up display 26 (see FIG. 2; omitted from illustration in FIG. 1). The heads-up display (referred to hereafter as the HUD) 26 corresponds to a display section of the present disclosure. The HUD 26 is capable of projecting an image onto a display region 26A set at a lower portion of the windshield glass 18 at the vehicle front of the driver's seat. The HUD 26 is configured to display images overlaid on the scene ahead viewed through the windshield glass 18 by an occupant in the driver's seat of the subject vehicle 12. The display region 26A of the HUD 26 is set smaller than a display region of the meter display 24.

Onboard System Configuration

FIG. 2 is a block diagram illustrating configuration of an onboard system 30 installed in the subject vehicle 12 described above. The onboard system 30 includes a communication bus 32. A peripheral situation acquisition device setup 34, a vehicle travel state detection sensor setup 46, an autonomous driving electronic control unit (ECU) 54, and the display control ECU 70 are respectively connected to the communication bus 32. Note that FIG. 2 only illustrates part of the onboard system 30.

The peripheral situation acquisition device setup 34 includes devices for acquiring information indicating the situation in the surrounding environment of the subject vehicle 12, such as a global positioning system (GPS) device 36, an onboard communication unit 38, a navigation system 40, a radar system 42, and cameras 44.

The GPS device 36 receives GPS signals from plural GPS satellites in order to find the position of the subject vehicle 12. The greater the number of GPS signals the GPS device 36 can receive, the better the positioning accuracy. The onboard communication unit 38 is a communication device that performs at least one out of vehicle-to-vehicle communication with other vehicles, or road-to-vehicle communication with roadside equipment. The navigation system 40 includes a map information storage section 40A that stores map information. The navigation system 40 performs processing to display the position of the subject vehicle 12 on a map, guide along a route to a destination, and so on based on position information obtained from the GPS device 36 and the map information stored in the map information storage section 40A.

The radar system 42 is configured of plural radar devices, each with a different detection range. The radar system 42 detects peripheral target objects such as pedestrians and other vehicles present in the surroundings of the subject vehicle 12 as point cloud data, and acquires relative positions and relative speeds of the detected peripheral target objects with respect to the subject vehicle 12. The radar system 42 includes an inbuilt processing device that processes search results regarding the peripheral target objects. The processing device employs changes in the relative position and relative speed of each peripheral target object included in plural most recent search results in order to exclude noise and roadside objects such as guardrails from monitoring targets, and to track specific target objects such as pedestrians and other vehicles, serving as monitoring-target target objects. The radar system 42 then outputs information such as the relative position and relative speed of each of the monitoring-target target objects. The cameras 44 are configured of plural cameras that image the surroundings of the subject vehicle 12 and output the captured images.

The vehicle travel state detection sensor setup 46 includes plural sensors for acquiring a travel state of the subject vehicle 12, such as a steering angle sensor 48 that detects the steering angle of the subject vehicle 12, a vehicle speed sensor 50 that detects the travel speed of the subject vehicle 12, and an acceleration sensor 52 that detects an acceleration rate of the subject vehicle 12.

A throttle ACT 56 that changes the throttle position of the subject vehicle 12, and a brake ACT 58 that changes braking force generated by a braking device of the subject vehicle 12 are connected to the autonomous driving ECU 54. A steering ACT 60 that changes a steering amount of a steering device of the subject vehicle 12 is also connected to the autonomous driving ECU 54.

The autonomous driving ECU 54 includes a central processing unit (CPU), memory such as read only memory (ROM) and random access memory (RAM), a non-volatile storage section such as a hard disk drive (HDD) or a solid state drive (SSD), and a communication interface (I/F). An autonomous driving program is stored in the storage section. When an autonomous driving mode has been selected, the CPU executes the autonomous driving program such that the autonomous driving ECU 54 performs autonomous driving processing to cause the subject vehicle 12 to travel autonomously without requiring an occupant of the subject vehicle 12 to perform driving operations. The autonomous driving processing is processing to determine the situation of the subject vehicle 12 and the periphery thereof based on information obtained from the peripheral situation acquisition device setup 34 and the vehicle travel state detection sensor setup 46, and to control the throttle ACT 56, the brake ACT 58, and the steering ACT 60 accordingly.

In the present exemplary embodiment, the autonomous driving level implemented by the autonomous driving ECU 54 may, for example, be any level between level 2 and level 5. During autonomous driving at level 2 or level 3, the driver is required to monitor the autonomous driving by the autonomous driving ECU 54 and to intervene if required in the event of driving falling outside of a controllable range, inappropriate operation due to misdetection, non-detection, or malfunction of sensors, or the like. During autonomous driving at level 4 or level 5, intervention by the driver is not required.

In the present exemplary embodiment, the autonomous driving implemented by the autonomous driving ECU 54 includes, for example, constant-speed travel in which the subject vehicle 12 travels in the same subject vehicle lane at a constant speed, following travel in which the subject vehicle 12 is set to follow another vehicle that is present in the subject vehicle lane within a predetermined distance ahead of the subject vehicle 12 (for example within 100 meters) and that is the closest other vehicle to the subject vehicle 12, lane changes in which the subject vehicle 12 changes lanes from the subject vehicle lane to an adjacent lane, branching travel in which the subject vehicle 12 branches off into a lane on an intended side at a location where the road splits, and merging travel in which the subject vehicle 12 merges with a main traffic lane at a location where roads merge.

The autonomous driving ECU 54 notifies the display control ECU 70 of information relating to peripheral target objects present in the surroundings of the subject vehicle 12. The autonomous driving ECU 54 also determines whether or not an object requiring caution that has implications for control during autonomous driving is present outside the subject vehicle lane based on information from the vehicle travel state detection sensor setup 46. In a case in which determination is affirmative, the autonomous driving ECU 54 notifies the display control ECU 70 that an object requiring caution is present and coordinates of the object requiring caution.

The autonomous driving ECU 54 also determines whether or not to cause the subject vehicle 12 to accelerate or decelerate based on map information and the like as well as information from the peripheral situation acquisition device setup 34. In a case in which determination is affirmative, the autonomous driving ECU 54 notifies the display control ECU 70 that the subject vehicle 12 should accelerate or decelerate, and the reason for this action (for example the presence of a curve ahead of the subject vehicle 12). Note that determinations and notifications relating to acceleration and deceleration of the subject vehicle 12 may be executed by an ECU other than the autonomous driving ECU 54.

Display Control ECU Configuration

The display control ECU 70 includes a central processing unit (CPU; processor) 72, memory 74 such as read only memory (ROM) and random access memory (RAM), a non-volatile storage section 76 such as a hard disk drive (HDD) or a solid state drive (SSD), and a communication interface (UF) 78. The CPU 72, the memory 74, the storage section 76, and the communication OF 78 are connected so as to be capable of communicating with each other through an internal bus 80. A display control program 82 is stored in the storage section 76. The display control program 82 is a program for implementing a display control method according to the present disclosure. The display control ECU 70 reads the display control program 82 from the storage section 76 and expands the program in the memory 74, and the display control program 82 expanded in the memory 74 is executed by the CPU 72 in order to perform display control processing, described later. The HUD 26 and the meter display 24 are electrically connected to the display control ECU 70.

Figure 3:
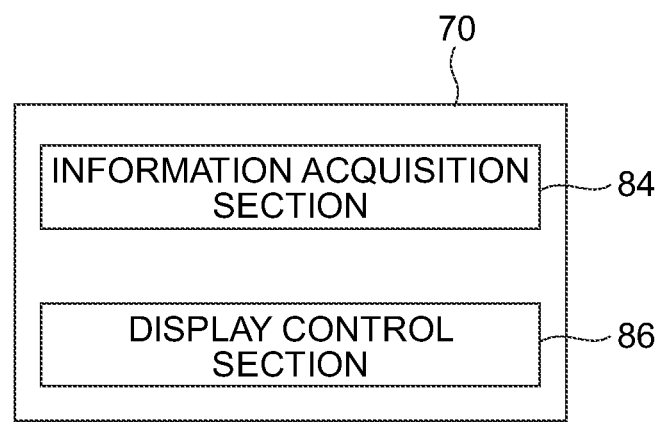
FIG. 3 is a block diagram illustrating a partial functional configuration of a display control ECU according to an exemplary embodiment.
Figure 4B:
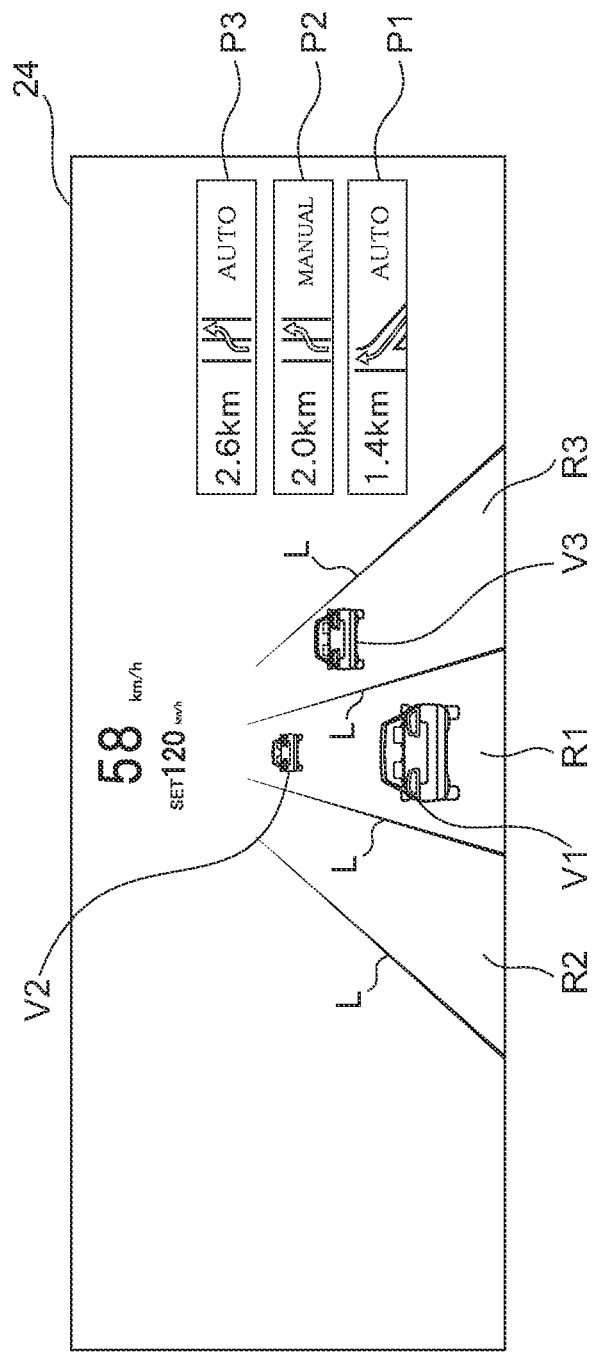
FIG. 4B is a diagram illustrating a first example of display on a meter display.

The display control ECU 70 employs the above hardware resources to implement various functionality. FIG. 3 is a block diagram illustrating some functional configurations implemented by the display control ECU 70. As illustrated in FIG. 3, functional configurations of the display control ECU 70 include an information acquisition section 84 and a display control section 86. These functional configurations are implemented by the CPU 72 reading and executing the display control program 82 stored in the storage section 76.

The information acquisition section 84 acquires information relating to traffic lanes and information relating to peripheral target objects recognized by the autonomous driving ECU 54 from the autonomous driving ECU 54. The traffic lane information includes information relating to the subject vehicle lane in which the subject vehicle 12 is currently traveling (such as information relating to whether the traffic lane is straight or curved), and information regarding adjacent lanes on the left and right of the subject vehicle lane (including whether or not such adjacent lanes exist). The information acquired by the information acquisition section 84 includes information relating to peripheral target objects present in the subject vehicle lane ahead of the subject vehicle 12, and information relating to an object requiring caution present outside the subject vehicle lane and having implications for control during autonomous driving. Note that the information acquisition section 84 may acquire information having implications for control during autonomous driving from ECUs and the like other than the autonomous driving ECU 54.

The display control section 86 controls display on the HUD 26 and the meter display 24 based on the information acquired by the information acquisition section 84. The display control section 86 is configured to display a first person perspective single lane display image such as that illustrated in FIG. 4A and FIG. 5A, and also of displaying a third person perspective multi-lane display image such as that illustrated in FIG. 6A, on the HUD 26. The display control section 86 is also configured to display a third person perspective multi-lane display image such as that illustrated in FIG. 4B, FIG. 5B, and FIG. 6B on the meter display 24.

The first person perspective single lane display image is an image simulating a scene ahead as viewed through the windshield glass 18 by an occupant in the driver's seat of the subject vehicle 12. The first person perspective single lane display image includes as display targets an image R1 of the subject vehicle lane in which the subject vehicle 12 is currently traveling, images L of boundary lines of the subject vehicle lane, and an image V2 of a peripheral target object (another vehicle in the examples illustrated in FIG. 4A and FIG. 5A) present ahead of the subject vehicle 12. Images of adjacent traffic lanes to the left and right of the subject vehicle lane are excluded from being display targets in the first person perspective single lane display image. Although peripheral target objects present in adjacent traffic lanes are in principle excluded from being display targets in the first person perspective single lane display image, objects requiring caution, described later, are included as display targets. Since information that is less important from the perspective of the occupant in the driver's seat ascertaining a state during autonomous driving is omitted from display in the first person perspective single lane display image, while the image V1 of the subject vehicle lane is displayed with an exaggeratedly large size, the image enables any annoyance to be minimized. The display control section 86 normally displays the first person perspective single lane display image on the HUD 26 during autonomous driving of the subject vehicle 12. Note that in the examples illustrated in FIG. 4A, FIG. 4B, FIG. 5A, and FIG. 5B, the autonomous driving of the subject vehicle 12 corresponds to following travel and the other vehicle displayed as the image V2 configures a followed target. In the examples illustrated in FIG. 4A, FIG. 5A, and FIG. 6A, the speed of the subject vehicle 12 and a cruise control speed setting are displayed below the display region 26A of the HUD 26.

The third person perspective multi-lane display image is an image representing the subject vehicle 12 and the periphery thereof as in a state viewed from obliquely above and to the rear of the subject vehicle 12 (a bird's-eye view). The third person perspective multi-lane display image includes images R2 and R3 of adjacent traffic lanes to the left and right of the subject vehicle lane as display targets. As an example, the third person perspective multi-lane display image is configured to display a maximum of three traffic lanes. However, there is no limitation to displaying a maximum of three lanes when facilitating understanding of, for example, transient states in which lanes branch or merge, and the number of traffic lanes displayed may be varied as appropriate. Display targets in the third person perspective multi-lane display image may include the image R1 of the subject vehicle lane, images R2, R3 of adjacent traffic lanes, images L of boundary lines between the respective traffic lanes, the image V2 of a peripheral target object (another vehicle in the examples illustrated in FIG. 4B and FIG. 5B) present in the subject vehicle lane ahead of the subject vehicle 12, and an image V3 of a peripheral target object (another vehicle in the examples illustrated in FIG. 4B, FIG. 5B, and FIG. 6B) present in the adjacent traffic lanes. In the examples illustrated in FIG. 4B, FIG. 5B, and FIG. 6B, the speed of the subject vehicle 12 and a cruise control speed setting are displayed at the top of the meter display 24. Scheduled actions P1 to P3 during autonomous driving are displayed on a right side portion of the meter display 24.

Figure 5B:
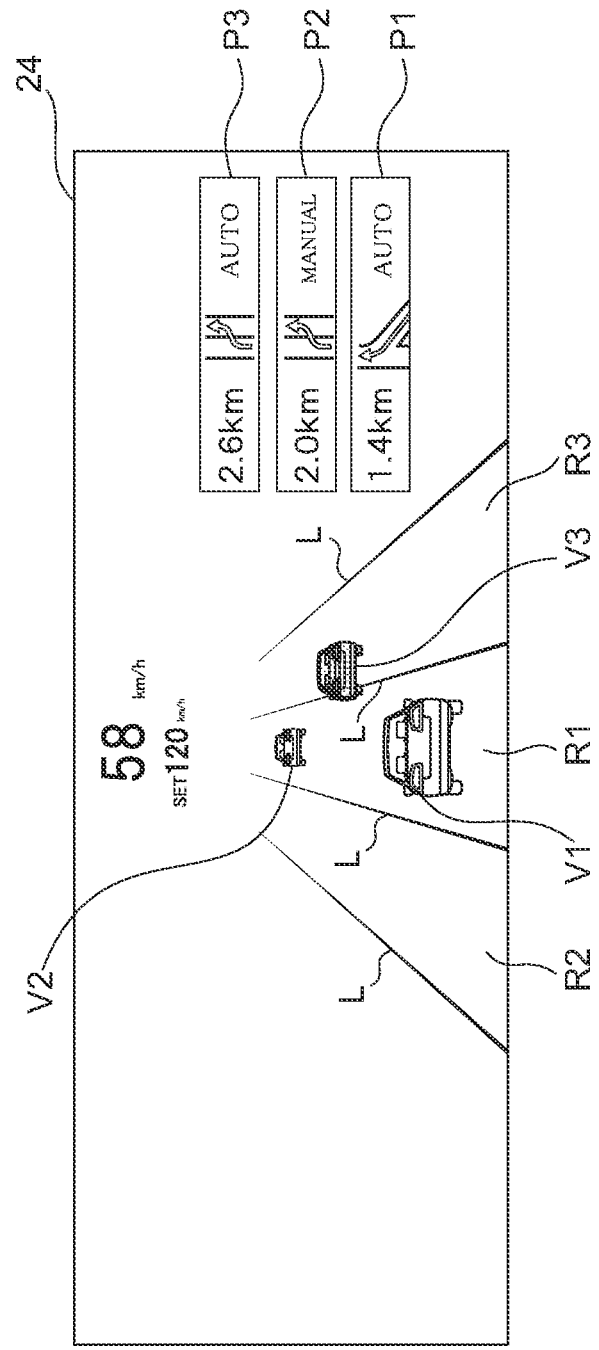
FIG. 5B is a diagram illustrating a second example of display on a meter display.

In a case in which the information acquisition section 84 has acquired information regarding an object requiring caution present outside of the subject vehicle lane and having implications for control during autonomous driving, the display control section 86 additionally displays an image of the object requiring caution on the HUD 26. Namely, for example, in a case in which another vehicle traveling in an adjacent traffic lane to the right of the subject vehicle lane attempts to cut in front of the subject vehicle 12 at high speed, the display control section 86 detects that there will be implications for control during autonomous driving based on information acquired by the information acquisition section 84 from the autonomous driving ECU 54. The display control section 86 then additionally displays an image V3 of the other vehicle that is attempting to cut in (namely the object requiring caution) on the HUD 26 as illustrated in FIG. 5A. When this is performed, the display control section 86 displays the image V3 of the other vehicle corresponding to an object requiring caution on the HUD 26 in a different color from the image V2 of a peripheral target object such as another vehicle present in the subject vehicle lane. As an example, in the present exemplary embodiment, the image V2 of another vehicle present in the subject vehicle lane is displayed in white, and the image V3 of the other vehicle corresponding to the object requiring caution is displayed in amber. The display control section 86 thereby displays the image V3 of the other vehicle corresponding to the object requiring caution with greater emphasis than the image V2 of another vehicle present in the subject vehicle lane. Namely, in the above example, the other vehicle V3 that is not a followed target is a factor that passively changes the behavior of the subject vehicle 12, and so is emphatically displayed. Note that in FIG. 5A and FIG. 5B, for reasons of convenience the image V3 is illustrated using dots instead of color.

Figure 6A:
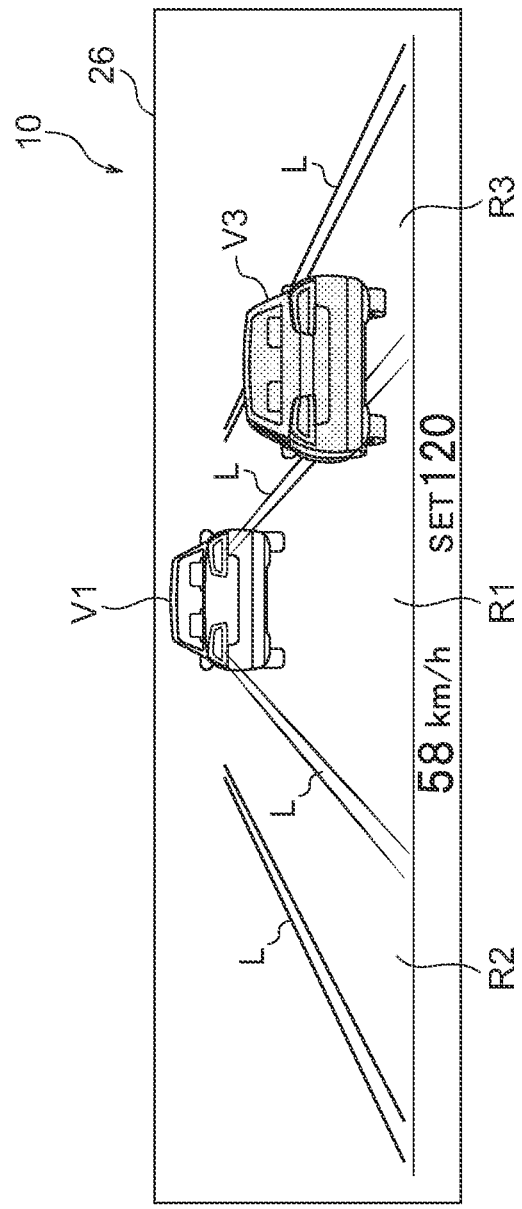
FIG. 6A is a diagram illustrating a third example of display on a heads-up display.
Figure 6B:
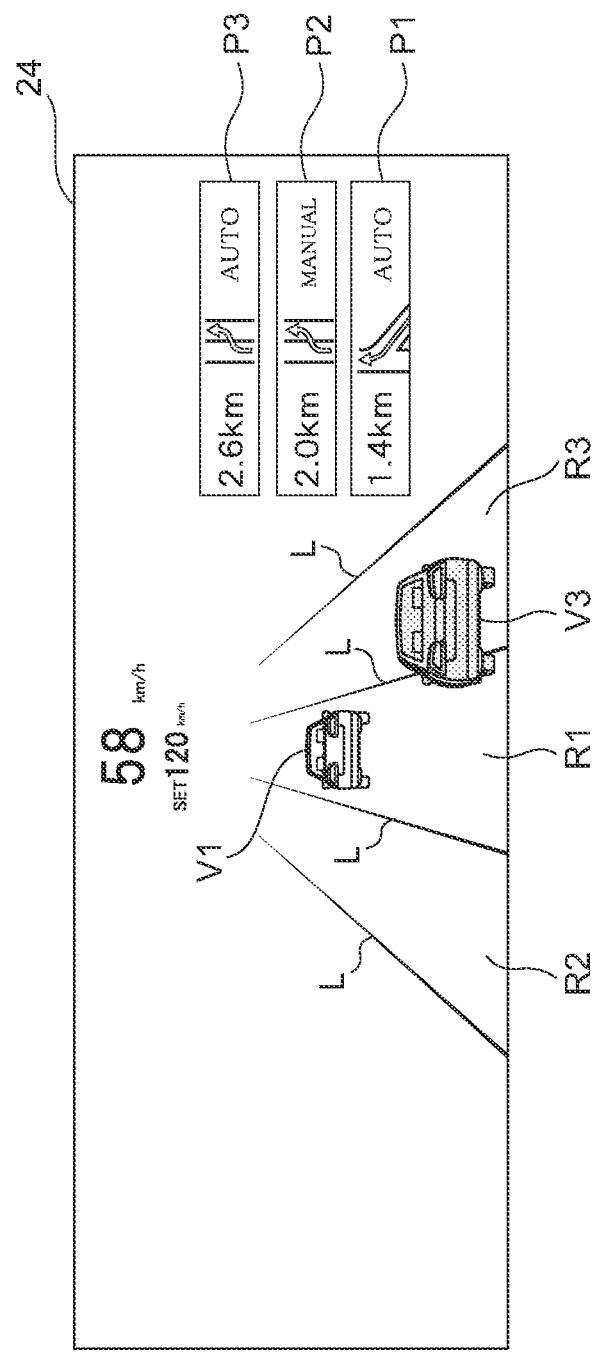
FIG. 6B is a diagram illustrating a third example of display on a meter display.

In a case in which the information acquisition section 84 has acquired information regarding an object requiring caution present behind or to the side of the subject vehicle 12, the display control section 86 changes the image displayed on the HUD 26 from the first person perspective single lane display image illustrated in FIG. 4A and FIG. 5A to the third person perspective multi-lane display image illustrated in FIG. 6A. This change to the third person perspective multi-lane display image is performed in the form of a continuous animation. By changing to the third person perspective multi-lane display image, the subject vehicle 12 and the image V3 of the object requiring caution present behind or to the side of the subject vehicle 12 (behind in the example illustrated in FIG. 6A) are displayed on the HUD 26 as an image simulating a state viewed from obliquely above and to the rear of the subject vehicle 12. When this is performed, the display control section 86 is configured to display the image V3 of the other vehicle corresponding to an object requiring caution on the HUD 26 with greater emphasis by using a different color from an image V1 of the subject vehicle 12 and to the image V2 corresponding to a peripheral target object such as another vehicle present in the subject vehicle lane. Note that in FIG. 6A and FIG. 6B, for reasons of convenience the image V3 is illustrated using dots instead of color.

Operation and Advantageous Effects

Next, explanation follows regarding operation and advantageous effects of the present exemplary embodiment.

FIG. 7 is a flowchart illustrating an example of a flow of display control processing executed by the display control ECU 70. In this display control processing, the CPU 72 reads the display control program 82 from the storage section 76, and expands and executes the display control program 82 in the memory 74. The display control processing is executed during autonomous driving of the subject vehicle 12 by the autonomous driving ECU 54.

First, at step S1 of the display control processing, the CPU 72 employs the functionality of the information acquisition section 84 to acquire information relating to the periphery of the subject vehicle 12. Step S1 corresponds to an "acquisition step" of the present disclosure. When the processing of step S1 has been completed, processing transitions to the next step S2.

At step S2, the CPU 72 employs the functionality of the display control section 86 to display the information acquired at step S1 as images on the HUD 26 and the meter display 24 respectively. When this is performed, a first person perspective single lane display image is displayed on the HUD 26 and a third person perspective multi-lane display image is displayed on the meter display 24. Step S2 corresponds to a "display step" of the present disclosure. When the processing of step S2 has been completed, processing transitions to the next step S3.

At step S3, the CPU 72 uses the information acquired using the functionality of the information acquisition section 84 to determine whether or not an object requiring caution and having implications for control during autonomous driving is present outside the subject vehicle lane. In a case in which determination is negative, processing returns to step S1 described above and the above-described processing is repeated. In a case in which determination is affirmative at step S3, processing transitions to the next step S4.

In a case in which processing transitions to step S4, the CPU 72 uses the information acquired using the functionality of the information acquisition section 84 to determine whether or not the object requiring caution is present ahead of the subject vehicle 12. In a case in which determination is affirmative, processing transitions to step S5, and in a case in which determination is negative, processing transitions to step S6. Steps S5 and S6 each correspond to an "additional display step" of the present disclosure.

In a case in which processing transitions to step S5, namely in a case in which the CPU 72 determines the object requiring caution to be present ahead of the subject vehicle 12, the CPU 72 employs the functionality of the display control section 86 to additionally display an image of the object requiring caution on the HUD 26 while in the first person perspective single lane display image state (see FIG. 5A). When this is performed, the CPU 72 displays the image of the object requiring caution additionally displayed on the HUD 26 (see the image V3 in FIG. 5A) with greater emphasis by using a different color from an image of a peripheral target object present in the subject vehicle lane (see the image V2 in FIG. 5A). When the processing of step S5 has been completed, processing returns to step S1 described above and the above-described processing is repeated.

In a case in which processing transitions to step S6, namely in a case in which the CPU 72 determines that the object requiring caution is not present ahead of the subject vehicle 12, the CPU 72 employs the functionality of the display control section 86 to switch to a third person perspective multi-lane display image on the HUD 26. The CPU 72 then additionally displays the object requiring caution that is not ahead of the subject vehicle 12, namely that is present to the rear or side of the subject vehicle 12, on the HUD 26. When this is performed, the CPU 72 displays the image of the object requiring caution additionally displayed on the HUD 26 (see the image V3 in FIG. 6A) with greater emphasis by using a different color from the image V1 of the subject vehicle 12. When the processing of step S6 has been completed, processing returns to step S1 described above and the above-described processing is repeated.

As described above, in the present exemplary embodiment, in a case in which information regarding an object requiring caution has been acquired by the information acquisition section 84, the display control section 86 additionally displays an image of the object requiring caution on the HUD 26. Additionally displaying the object requiring caution on the display section in this manner helps the occupant in the driver's seat to anticipate that there will be implications for control during autonomous driving. This enables any anxiety felt by the occupant in the driver's seat during autonomous driving to be suppressed. Moreover, normally when an object requiring caution is not present, the first person perspective single lane display image is displayed on the HUD 26, and peripheral target objects present outside the subject vehicle lane are not displayed on the HUD 26. This enables any annoyance felt by the occupant in the driver's seat to be suppressed.

In particular, since the HUD 26 is used to display images overlaid on the scene ahead as viewed through the windshield glass 18 by the occupant in the driver's seat, were a greater number and variety of images to be displayed on the HUD 26, the occupant in the driver's seat may find this excessive amount of information annoying. The present exemplary embodiment enables such annoyance to be suppressed.

Moreover, in the present exemplary embodiment, in a case in which an image of an object requiring caution is additionally displayed on the HUD 26, the image of the object requiring caution is displayed in a different color from an image of a peripheral target object present in the subject vehicle lane. The color difference enables the image of the object requiring caution to be emphasized, thereby helping the occupant in the driver's seat to recognize the object requiring caution. This further helps the occupant to anticipate that there will be implications for control during autonomous driving.

In the present exemplary embodiment, in a case in which an object requiring caution having implications for control during autonomous driving is present ahead of the subject vehicle 12, the object requiring caution is displayed on the HUD 26 as an image simulating a state viewed through the windshield glass 18 by the occupant in the driver's seat of the subject vehicle 12. This helps the occupant in the driver's seat to recognize the actual situation.

In the present exemplary embodiment, in a case in which an object requiring caution having implications for control during autonomous driving is present to the rear or to the side of the subject vehicle 12, the object requiring caution and the subject vehicle 12 are displayed on the HUD 26 as an image simulating a state viewed from obliquely above and to the rear of the subject vehicle 12. This helps the occupant in the driver's seat to anticipate that there will be implications for autonomous driving control due to an object requiring caution being present to the rear or to the side of the subject vehicle 12.

Moreover, in the present exemplary embodiment, the subject vehicle 12 and its periphery are displayed on the meter display 24 provided to the instrument panel 14 as the subject vehicle 12 as an image simulating a state viewed from obliquely above and to the rear of the subject vehicle 12. Since the meter display 24 has a larger display region than the HUD 26, information and so on that may become annoying were it to be displayed on the HUD 26 can easily be displayed on the meter display 24. This enables any annoyance felt toward display on the HUD 26 to be suppressed, while also conveying a variety of information to the occupant in the driver's seat using the meter display 24.

Although explanation has been given regarding the display control ECU 70 according to an exemplary embodiment, obviously various modifications may be implemented within a range not departing from the spirit of the present disclosure. For example, although the meter display 24 of the exemplary embodiment described above is provided to the instrument panel 14 at the vehicle front of the driver's seat, there is no limitation thereto. The meter display 24 may be configured by a central display provided at a vehicle width direction central portion of the instrument panel 14.

Moreover, although the HUD 26 that projects an image onto the windshield glass 18 configuring the windshield is employed as a display section in the exemplary embodiment described above, there is no limitation thereto. For example, a display section may project an image onto a projection surface other than a windshield.

Although the HUD 26 displays an image of an object requiring caution with greater emphasis by using a different color from an image of a peripheral target object present in the subject vehicle lane in the exemplary embodiment described above, there is no limitation thereto. A different method may be used to emphasize an image of an object requiring caution. For example, the brightness or tone may be differentiated between an image of an object requiring caution and an image of a peripheral target object, or display relating to the object requiring caution may made to flash.

Note that the display control processing executed by the CPU 72 reading and executing software (a program) in the above exemplary embodiment may be executed by various types of processor other than the CPU 72. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The display control processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, although various data is stored in the non-volatile storage section 76 configured by a HDD, SSD, or the like in the above exemplary embodiment, there is no limitation thereto. For example, a storage section may be configured by a recording medium such as a compact disc (CD), a digital versatile disc (DVD), or universal serial bus (USB) memory. In such cases, various programs and data may be held in such recording media.

Figure 8A:
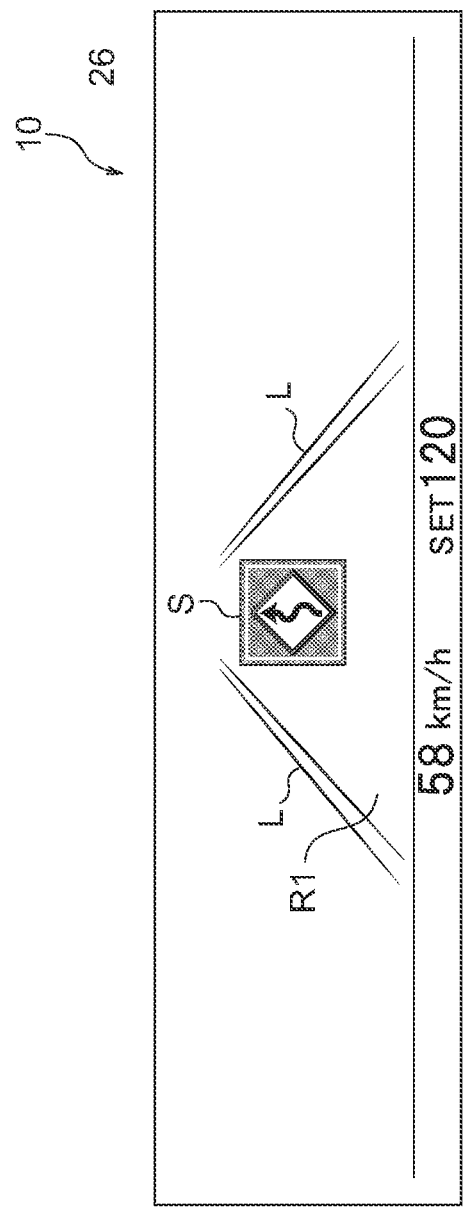
FIG. 8A is a diagram illustrating an example of display on a heads-up display of a reference example.

In a case in which information regarding an object requiring caution present outside the subject vehicle lane and having implications for control during autonomous driving is acquired by the information acquisition section 84, the display control ECU 70 performs additional display of an image of the object requiring caution on the HUD 26 and the meter display 24 in the exemplary embodiment described above. However, there is no limitation thereto. For example, configuration may be made as in a reference example illustrated in FIG. 8A and FIG. 8B. In this reference example, the information acquisition section 84 acquires information requiring caution relating to the road profile from the autonomous driving ECU 54, or another ECU or the like. This information requiring caution is information having implications for control during autonomous driving. For example, the information requiring caution includes information relating to road signs relating to the road profile. In a case in which the information acquisition section 84 has acquired such information requiring caution, the display control section 86 additionally displays an image representing the information requiring caution on the HUD 26 and the meter display 24. As an example, FIG. 8A and FIG. 8B illustrate additional display of an image S of a road sign warning of a bend to the right (a curve in the road) on the HUD 26 and the meter display 24.

Figure 9:
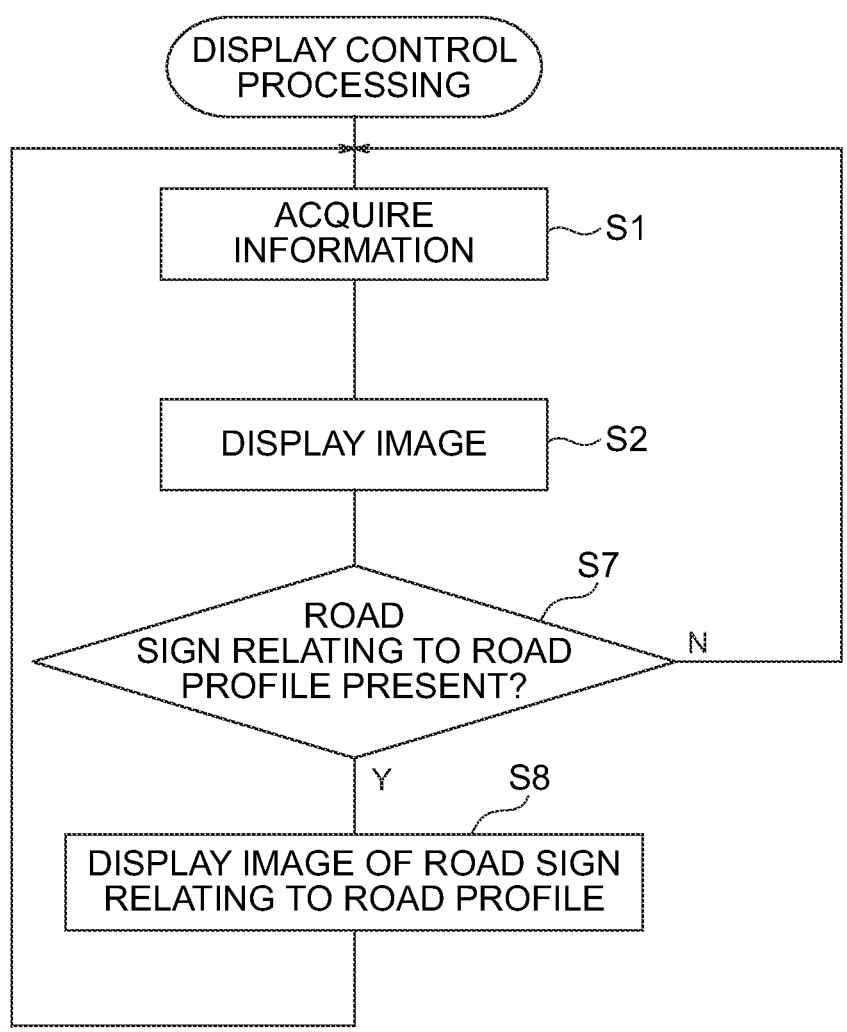
FIG. 9 is a flowchart illustrating an example of a flow of display control processing in a reference example.

FIG. 9 is a flowchart illustrating an example of a flow of display control processing executed by the display control ECU 70 in the above-described reference example. Note that in FIG. 9, processing that matches that of the exemplary embodiment described above is allocated the same reference numerals. In this display control processing, when the processing of step S2 has been completed, processing transitions to the next step S7.

At step S7, the CPU 72 determines whether or not information regarding a road sign relating to the road profile (namely information requiring caution) is included in the information acquired using the functionality of the information acquisition section 84. In a case in which determination is negative, processing returns to step S1 described above and the above-described processing is repeated. In a case in which determination is affirmative at step S7, processing transitions to step S8.

In a case in which processing transitions to step S8, the CPU 72 employs the functionality of the display control section 86 to additionally display an image S of the road sign on the HUD 26 and the meter display 24. FIG. 8A and FIG. 8B illustrate an example in which an image S of the road sign is displayed over the image R1 of the subject vehicle lane. When this is performed, the CPU 72 for example displays the image S of the road sign with greater emphasis by employing a different display mode to that for the image V1 of the subject vehicle 12 and so on. When the processing of step S8 has been completed, processing returns to step S1 described above and the above-described processing is repeated.

In the reference example described above, the image S of the road sign relating to the road profile, namely an image representing the information requiring caution, is additionally displayed on the HUD 26 or the like to help the occupant in the driver's seat to anticipate that there will be implications for control during autonomous driving. This enables any anxiety felt by the occupant in the driver's seat during autonomous driving to be suppressed. Moreover, normally when an information requiring caution is not present, images representing information requiring caution are not displayed on the HUD 26. This enables any annoyance felt by the occupant in the driver's seat to be suppressed.

What is claimed is:

1. A display control device installed in a vehicle configured to enable autonomous driving, the display control device comprising:
   a processor programmed to:
      acquire information relating to a periphery of the vehicle, the information relating to the periphery of the vehicle including information relating to a peripheral target object that is present ahead of the vehicle and in a subject vehicle lane in which the vehicle is currently traveling;
      determine whether the information relating to the periphery of the vehicle includes information relating to an object requiring caution that is present outside of the subject vehicle lane and has implications for control during the autonomous driving;
      in a case in which the processor determines that the information relating to the periphery of the vehicle includes the information relating to the object requiring caution, display an image of the peripheral target object, regarding which the information has been acquired, on a display provided inside a cabin of the vehicle, and display, on the display, an image of the object requiring caution (i) simultaneously with the image of the peripheral target object and (ii) with greater emphasis than the image of the peripheral target object; and
      in a case in which the processor determines that the information relating to the periphery of the vehicle does not include the information relating to the object requiring caution, display the image of the peripheral target object, regarding which the information has been acquired, on the display, and not display, an image of the peripheral target object present outside the subject vehicle lane on the display even when the peripheral target object present outside the subject vehicle lane is detected.

2. The display control device of claim 1, wherein the display is a heads-up display configured to display the respective images overlaid on a scene ahead as viewed through a windshield of the vehicle by an occupant in a driver's seat of the vehicle.

3. The display control device of claim 1, wherein the processor is programmed to display the image of the object requiring caution in a different color from the image of the peripheral target object.

4. The display control device of claim 1, wherein, in a case in which the processor has acquired the information relating to the object requiring caution that is present ahead of the vehicle, the processor is programmed to display a simulated image of the object requiring caution on the display, the simulated image being generated as though it was viewed through a windshield of the vehicle by an occupant in a driver's seat of the vehicle.

5. The display control device of claim 1, wherein, in a case in which the processor has acquired the information relating to the object requiring caution, which is present to the rear or to a side of the vehicle, the processor is programmed to display a simulated image of the object requiring caution and the vehicle on the display, the simulated image being generated as though it was viewed from obliquely above and to the rear of the vehicle.

6. The display control device of claim 1, wherein:
   the display is a heads-up display configured to display the respective images overlaid on a scene ahead as viewed through a windshield of the vehicle by an occupant in a driver's seat of the vehicle;
   a meter display having a larger display region than the heads-up display is provided at an instrument panel of the vehicle; and
   the processor is programmed to display a simulated image of the vehicle and the periphery of the vehicle on the meter display, the simulated image being generated as though it was viewed from obliquely above and to the rear of the vehicle.

7. The display control device of claim 1, wherein:
   the object requiring caution is an another vehicle attempting to cut in front of the vehicle.

8. The display control device of claim 1, wherein:
   the processor is programmed to acquire information requiring caution relating to a road profile that is information having implications for control during autonomous driving; and
   the processor is programmed to additionally display, on the display, an image of the information requiring caution in a case in which the information requiring caution has been acquired by the processor.

9. The display control device of claim 1, wherein the processor is programmed to display the image of the object requiring caution in a different brightness or tone from the image of the peripheral target object.

10. The display control device of claim 1, wherein the processor is programmed to display the image of the object requiring caution to flash.

11. A display control method for implementation by a processor installed in a vehicle configured to enable autonomous driving, the display control method comprising:

acquiring information relating to the periphery of the vehicle, the information relating to the periphery of the vehicle including information relating to a peripheral target object that is present ahead of the vehicle and in a subject vehicle lane in which the vehicle is currently traveling;

determining whether the information relating to a periphery of the vehicle includes information relating to an object requiring caution that is present outside of the subject vehicle lane and has implications for control during the autonomous driving;

in a case in which the information relating to the periphery of the vehicle is determined to include the information relating to the object requiring caution, displaying an image of the peripheral target object, regarding which information has been acquired, on a display provided inside a cabin of the vehicle, and displaying, on the display, an image of the object requiring caution (i) simultaneously with the image of the peripheral target object and (ii) with greater emphasis than the image of the peripheral target object; and in a case in which the information relating to the periphery of the vehicle is determined to not include the information relating to the object requiring caution, displaying the image of the peripheral target object, regarding which the information has been acquired, on the display, and not displaying, an image of the peripheral target object present outside the subject vehicle lane on the display even when the peripheral target object present outside the subject vehicle lane is detected.

12. A display control device installed in a vehicle configured to enable autonomous driving, the display control device comprising:

a processor programmed to:

acquire information relating to the periphery of the vehicle, the information relating to the periphery of the vehicle including information relating to a peripheral target object that is present ahead of the vehicle and in a subject vehicle lane in which the vehicle is currently traveling;

determine whether the information relating to a periphery of the vehicle includes information relating to an object requiring caution that is present outside of the subject vehicle lane and has implications for control during the autonomous driving;

in a case in which the processor determines that the information relating to the periphery of the vehicle includes the information relating to the object requiring caution, display an image of the peripheral target object, regarding which information has been acquired, on a display provided inside a cabin of the vehicle, and to display, on the display, an image of the object requiring caution in a case in which the information relating to the object requiring caution has been acquired by the processor; and in a case in which the processor determines that the information relating to the periphery of the vehicle does not include the information relating to the object requiring caution, display the image of the peripheral target object, regarding which the information has been acquired, on the display, and not display, an image of the peripheral target object present outside the subject vehicle lane on the display even when the peripheral target object present outside the subject vehicle lane is detected, wherein the image of the object requiring caution is a simulated image of the object requiring caution on the display, the simulated image being generated as though it was viewed through a windshield of the vehicle by an occupant in a driver's seat of the vehicle.

* * * * *